Patented Oct. 9, 1945

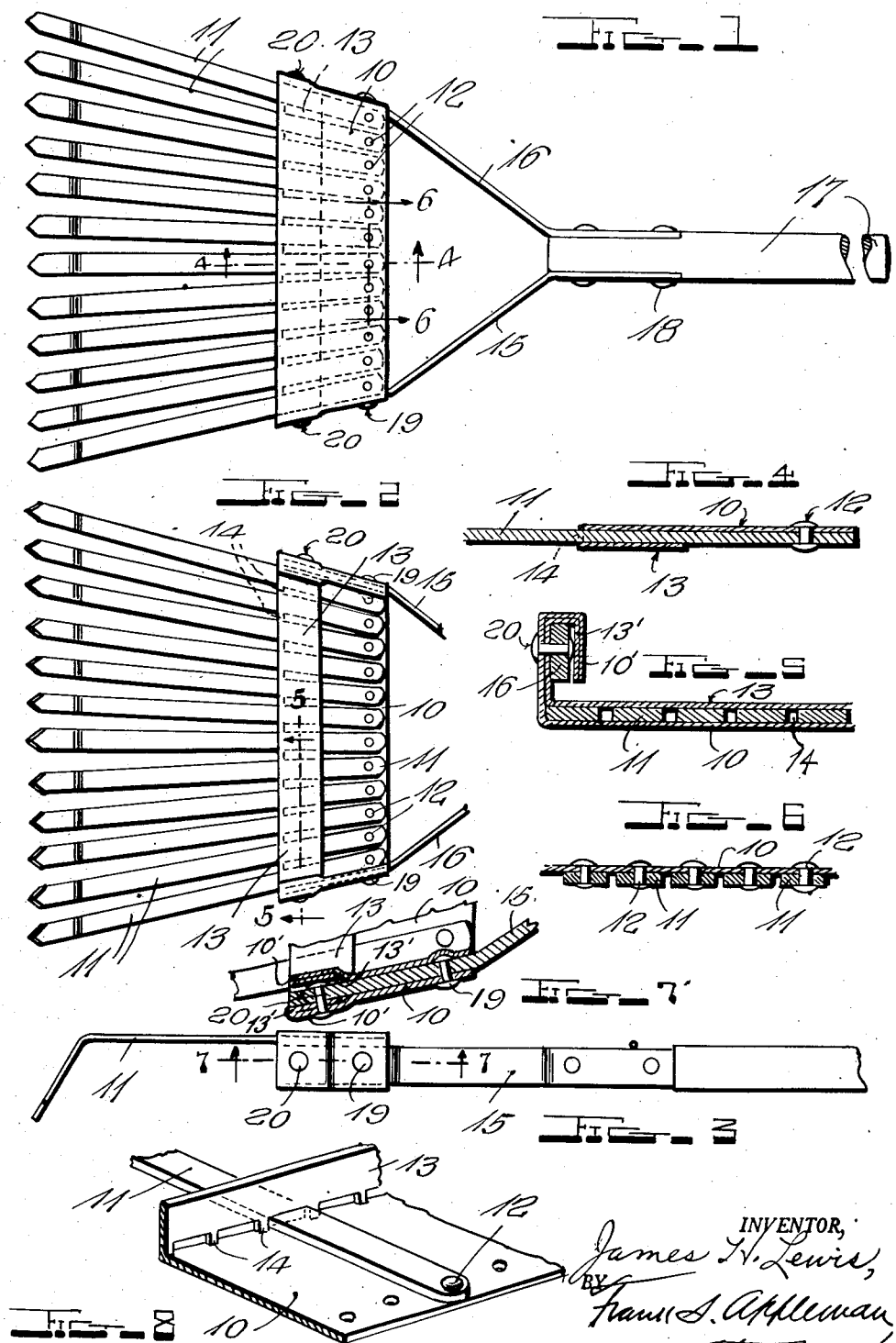

2,386,617

UNITED STATES PATENT OFFICE 2,386,617

METAL RAKE

James H. Lewis, Greenwood, S. C.

Application July 17, 1944, Serial No. 545,205

1 Claim. (Cl. 56—400.17)

This invention relates to implements or tools, and particularly to a rake or tool that can be employed for light cultivation of vegetation and, for the purposes of this disclosure, it will be hereinafter referred to as a "rake."

A purpose of the inventor is to form a head to which the inner ends of the tines are attached, and to provide means associated with the head for bracing the tines at the outer edge of the head, and other means engaging the edges of the tines to prevent lateral movement thereof.

It is furthermore an object to produce a head with novel means for its attachment to arms, which arms are to be connected to a handle, and to provide attachments by which the head is secured to the arms to produce a strong, rigid structure and one that can be expeditiously and inexpensively produced.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which:

Figure 1 illustrates a plan view of a rake embodying the invention;

Figure 2 illustrates an underneath plan view of the head of the rake;

Figure 3 illustrates a perspective view of a fragment of the head and a fragment of the tine anchored thereon;

Figure 4 illustrates a sectional view on the line 4—4 of Fig. 1;

Figure 5 illustrates a sectional view on the line 5—5 of Fig. 2;

Figure 6 illustrates a sectional view on the line 6—6 of Fig. 1;

Figure 7 illustrates a sectional view on the line 7—7 of Fig. 3; and

Figure 8 illustrates a perspective view of a fragment of the head of the rake.

In the drawing the head of the rake is shown as comprising a top plate 10, to which the inner ends of the tines 11 are secured by fastenings, such as rivets 12, and the said plate has a flange or extension 13 joined to it by the integral tongues 14, which tongues are spaced apart approximately the distance of the width of the tines so that the tines extend outwardly beyond the end of the plate 10 and, in the further formation of the head, the flange or extension 13 is bent back to overlie and engage the lower surfaces of the tines so that the said tines are braced when the flange or extension is secured in a manner to be presently explained. It is furthermore shown that the tongues 14 engage the edges of the tines, this relation of parts being fully shown in Fig. 8, although in this figure the extension is not in the position which it occupies when finished.

Arms 15 and 16 have their inner ends engaging a handle 17 to which they are attached by suitable means 18, such as rivets, or the like. The outer ends of the arms diverge and the head of the rake is secured to them. As illustrated, the head comprises the plate 10 and extension 13, and the ends of the plate and extension overlie the upper edges of the arms. In fastening the head to the arms, the plate and the parallel extension are applied to the upper edges of the arms with their ends projecting therefrom. The plate and extension are then bent downwardly along the sides of the arms and secured thereto by fastenings 19 and 20. The projecting portions of the plate and extension, identified by the reference characters 10' and 13', are folded under the arms and bent upwardly along the inside surfaces of the arms, the relation of parts being shown in Figures 5 and 7. The parallel portions of the plate and extension which are attached to the arms afford a rigid structure, as the plate is comparatively wide from its front to its rear edge and the tines which are anchored to the plate at the rear end are braced toward their front ends by the integral plate and extension which results in a strong and rigid assembly.

The plate and extension are of one-piece construction, as stated, and when assembled to embrace a tine at the outer edge of the plate, a double thickness of metal is presented, which results in rigidity and durability.

I claim:

In a metal rake, a head comprising a plate having an extension at its forward edge, spaced tongues integral with the plate and extension, tines having their inner ends projecting through the spaces between the tongues terminating near the rear edge of the plate, means for anchoring the inner ends of the tines to the plate, the said extension being folded back on the under surfaces of the tines, a handle having arms to which the head of the rake is secured, the plate and extension overlying the upper edges of the arms and shaped to embrace the sides and under surfaces of the arms and folded around the lower edges of said arms in parallel relation to each other, and means for securing the parallel portions of the plate and extension together to said arms.

JAMES H. LEWIS.